United States Patent
Tanaka et al.

(10) Patent No.: US 9,294,654 B2
(45) Date of Patent: Mar. 22, 2016

(54) HIGH-RESOLUTION IMAGE GENERATION METHOD

(75) Inventors: Masayuki Tanaka, Tokyo (JP);
Masatoshi Okutomi, Tokyo (JP)

(73) Assignee: TOKYO INSTITUTE OF TECHNOLOGY, Tokyo (JP)

( * ) Notice: Subject to any disclaimer, the term of this patent is extended or adjusted under 35 U.S.C. 154(b) by 1423 days.

(21) Appl. No.: 12/446,760

(22) PCT Filed: Sep. 26, 2007

(86) PCT No.: PCT/JP2007/069321
§ 371 (c)(1),
(2), (4) Date: Apr. 23, 2009

(87) PCT Pub. No.: WO2008/050589
PCT Pub. Date: May 2, 2008

(65) Prior Publication Data
US 2010/0002949 A1   Jan. 7, 2010

(30) Foreign Application Priority Data
Oct. 25, 2006 (JP) .................... 2006-290008

(51) Int. Cl.
*G06K 9/32* (2006.01)
*H04N 1/387* (2006.01)
*G06T 1/00* (2006.01)
*G06T 3/40* (2006.01)

(52) U.S. Cl.
CPC ............ *H04N 1/3871* (2013.01); *G06T 1/0007* (2013.01); *G06T 3/4069* (2013.01)

(58) Field of Classification Search
USPC ....................................................... 382/300
See application file for complete search history.

(56) References Cited

U.S. PATENT DOCUMENTS

| | | | | |
|---|---|---|---|---|
| 5,889,526 | A | * | 3/1999 | Hashimoto .................... 345/582 |
| 2002/0141005 | A1 | * | 10/2002 | Okisu et al. .................... 358/540 |
| 2004/0001648 | A1 | * | 1/2004 | Curry et al. .................... 382/302 |
| 2005/0244081 | A1 | * | 11/2005 | Zhou et al. .................... 382/299 |

FOREIGN PATENT DOCUMENTS

| | | |
|---|---|---|
| JP | 2006-127241 | 5/2006 |
| JP | 2006-309649 | 11/2006 |

OTHER PUBLICATIONS

Michal Irani, Super Resolution From Image Sequences, IEEE 1990.*
Tanaka, et al., "A Fast Algorithm for MAP Super-resolution", vol. 47, No. SIG 10 (CVM 15), pp. 2-15.
Sung Cheol Park, et al., "Super-Resolution Image Reconstruction: A Technical Overview", IEEE Signal Processing Magazine, Tokyo Institute of Technology, May 2003, pp. 21-36.
M.-C. Chiang, et al, "Efficient Super-Resolution Via Image Warping", Inmage and Vision Computing 18, 2000, Elsevier Science B.V., pp. 761-771.
International Search Report for PCT/JP2007/069321 Dated Dec. 25, 2007.

* cited by examiner

*Primary Examiner* — Mark Roz
(74) *Attorney, Agent, or Firm* — Nixon Peabody LLP; Jeffrey L. Costellia

(57) ABSTRACT

The present invention provides a high-resolution image generation method which is capable of generating a high-resolution image from multiple low-resolution images having displacements without using an iterative computation.
A high-resolution image generation method for generating a high-resolution image from multiple low-resolution images having displacements, comprises a first step of performing a registration processing of multiple low-resolution images; a second step of generating an average image having the undefined pixels and a weighted image based on the displacement information obtained by the registration processing and multiple low-resolution images; and a third step of generating the high-resolution image by estimating pixel values of the undefined pixels included in the average image.

21 Claims, 8 Drawing Sheets

(A) ONE IMAGE (B) TWO IMAGES (C) FIVE IMAGES (D) TEN IMAGES (E) TWENTY IMAGES (F) THIRTY IMAGES (A) ONE IMAGE (B) TWO IMAGES (C) FIVE IMAGES (D) TEN IMAGES (E) TWENTY IMAGES (F) THIRTY IMAGES

HIGH-RESOLUTION IMAGE GENERATION METHOD

TECHNICAL FIELD

The present invention relates to a high-resolution image generation method for generating a high-resolution image from multiple low-resolution images.

BACKGROUND TECHNIQUE

The image processing technology that reconstructs a high-resolution image from multiple low-resolution images, is called the super-resolution processing, and many technologies have been developed conventionally.

For example, as described in Non-Patent Document 1, the typical super-resolution processing methods such as the ML (Maximum-Likelihood) method, the MAP method (Maximum A Posterior) method and the POCS (Projection Onto Convex Sets) method are proposed.

The ML method is a method that defines an evaluation function as square error between the estimated pixel value from an assumed high-resolution image and the actually observed pixel value, and sets a high-resolution image minimizing the evaluation function as an estimated image. In other words, the ML method is a super-resolution processing method based on the principle of maximum likelihood estimation.

Further, the MAP method is a method that estimates the high-resolution image minimizing an evaluation function which added probability information of the high-resolution image to square error. In other words, the MAP method is a super-resolution processing method that estimates the high-resolution image as an optimization problem maximizing posterior probability by using certain prior information for the high-resolution image.

Moreover, the POCS method is a super-resolution processing method that obtains the high-resolution image by generating simultaneous equations about the pixel values of the low-resolution image and the high-resolution image and then solving the simultaneous equations successively.

All of the above-described super-resolution processing methods have the common features of assuming a high-resolution image (an initial high-resolution image), estimating its pixel value for each pixel of all low-resolution images based on a point spread function (PSF) obtained from a camera model from the assumed high-resolution image and then searching for a high-resolution image by minimizing the difference between the estimated value and the observed pixel value (the observed value) Therefore, these super-resolution processing methods are called reconstruction-based super-resolution processing methods.

Since all of the above-described existing reconstruction-based super-resolution processing methods reconstruct a high-resolution image by an iterative computation that needs an initial high-resolution image, the computation cost is very large. Therefore, the reduction of the computation cost was a main problem of existing super-resolution processing methods.

In order to solve this problem, as described in Patent Document 1, inventors of the present invention developed "a fast method of super-resolution processing" that realizes speedup of the super-resolution processing (the iterative reconstruction processing) by reducing the computation cost.

On the other hand, as a high-resolution image generation method reconstructing a high-resolution image from multiple low-resolution images that does not need an iterative computation, for example, there is a method described in Non-Patent Document 2. In the method described in Non-Patent Document 2, although the iterative computation is not performed, the low-resolution image is interpolated to the size of the high-resolution image. A problem that the generated high-resolution image becomes a blurred image by the influence of the interpolation, occurs.

DISCLOSURE OF THE INVENTION

The present invention has been developed in view of the above described circumstances, and an object of the present invention is to provide a high-resolution image generation method which is capable of generating a high-resolution image from multiple low-resolution images having displacements without using an iterative computation.

Further, another object of the present invention is to provide a high-resolution image generation method in which whenever a low-resolution image is obtained, the high-resolution image is generated sequentially.

The present invention relates to a high-resolution image generation method for generating a high-resolution image from multiple low-resolution images having displacements. The above object of the present invention is effectively achieved by the construction that said method characterized by comprising: a first step of performing a registration processing of said multiple low-resolution images; a second step of generating an average image having the undefined pixels and a weighted image based on the displacement information obtained by said registration processing and said multiple low-resolution images; and a third step of generating said high-resolution image by estimating pixel values of said undefined pixels included in said average image. Further, the above object of the present invention is also effectively achieved by the construction that said third step estimates the pixel value of said undefined pixel by interpolating pixel values of defined pixels existing in the neighborhood of said undefined pixel. Further, the above object of the present invention is also effectively achieved by the construction that said third step sets a predetermined image having the number of pixels same as said average image as a reference image and then sets the pixel value of a pixel of said reference image corresponding to said undefined pixel as the pixel value of said undefined pixel. Further, the above object of the present invention is also effectively achieved by the construction that a method that estimates the pixel value of said undefined pixel by interpolating pixel values of defined pixels existing in the neighborhood of said undefined pixel, is referred to as a first undefined pixel estimation method, a method that sets a predetermined image having the number of pixels same as said average image as a reference image and then sets the pixel value of a pixel of said reference image corresponding to said undefined pixel as the pixel value of said undefined pixel, is referred to as a second undefined pixel estimation method, said third step estimates the pixel value of said undefined pixel by performing the alpha blend of a first undefined pixel value estimated by said first undefined pixel estimation method and a second undefined pixel value estimated by said second undefined pixel estimation method. Further, the above object of the present invention is also effectively achieved by the construction that the alpha value of said alpha blend is changed based on the pixel position of said undefined pixel. Further, the above object of the present invention is also effectively achieved by the construction that the alpha value of said alpha blend is estimated based on the number of said defined pixels existing in the neighborhood of said undefined pixel.

Further, the above object of the present invention is effectively achieved by the construction that a high-resolution image with a more higher definition is reconstructed by using said high-resolution image generated by the above high-resolution image generation method as an initial image of the super-resolution processing that needs the iterative processing (the iterative reconstruction processing) and then performing said iterative reconstruction processing.

Moreover, the above object of the present invention is effectively achieved by the construction that whenever a low-resolution image is obtained, by applying the above high-resolution image generation method, said high-resolution image is generated sequentially by updating said average image with said undefined pixels and said weighted image and then estimating pixel values of said undefined pixels included in the updated average image.

THE BEST MODE FOR CARRYING OUT THE INVENTION

Figure 1:
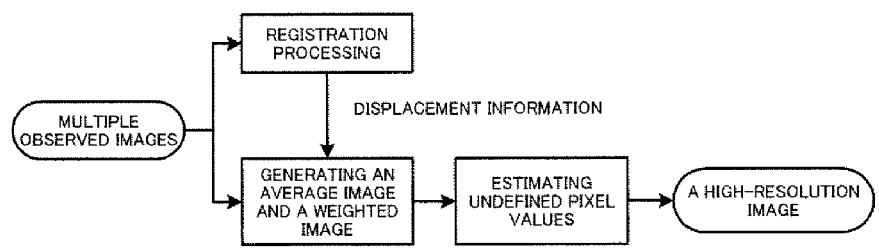
FIG. 1 is a block diagram illustrating a schema of a high-resolution image generation method according to the present invention.

The following is a description of preferred embodiments for carrying out the present invention, with reference to the accompanying drawings.

A high-resolution image generation method according to the present invention is a high-resolution image generation method which is capable of generating (reconstructing) a high-resolution image from multiple low-resolution images having displacements (hereinafter "the low-resolution image" is also simply referred to as "the observed image") without using an iterative computation.

In the present invention, in order to generate (reconstruct) a high-resolution image from multiple low-resolution images having displacements, firstly, it is necessary to perform a registration processing of these multiple low-resolution images.

In the registration processing, each pixel of multiple observed images (multiple low-resolution images) having displacements, is corresponded to a certain position in a high-resolution image space by the registration. That is to say, it is possible to regard the pixels of multiple observed images after the registration as the pixels sampled at unequal interval within a high-resolution image space.

These pixel positions sampled at unequal interval (hereinafter also simply referred to as "the observed pixel positions") are approximated by the pixel positions of the high-resolution image (hereinafter also simply referred to as "the high-resolution pixel positions"). In this case, it can be considered that there are multiple observed pixels (i.e. multiple observed pixel positions) approximated by a certain high-resolution pixel position. On the other hand, the high-resolution pixel positions by which no observed pixel (i.e. the observed pixel position) is approximated, also exist.

Here, it is possible to generate an image by computing the average pixel value of multiple observed pixels approximated by each high-resolution pixel position. In the present invention, this image is called "an average registration image". In addition, hereinafter this average registration image is also simply referred to as "an average image".

The average registration image is equal to the high-resolution image in the pixel interval (the number of pixels). However, in the average registration image, the pixel value of the pixel position by which no observed pixel is approximated, is not defined. Here, a pixel within the average registration image that the pixel value is not defined, is referred to as "an undefined pixel". In other words, since the undefined pixels are included in the average image, one can say is that the average image is not a complete high-resolution image. Further, with respect to all remaining pixels except the undefined pixels within the average image, since those pixel values are defined, hereinafter also simply referred to as "defined pixels".

Further, the number of the observed pixels approximated by each high-resolution pixel position also constructs an image. In the present invention, this image is called "a weighted image".

In other words, the weighted image is equal to the average image in the number of pixels. Further, in the weighted image, the pixel values of pixels existing in positions that are the same as the pixel positions of the undefined pixels of the average image are zero, and pixels existing in positions that are the same as the pixel positions of the defined pixels of the average image have pixel values larger than zero.

As described above, it is possible to generate the average image having the undefined pixels and the weighted image based on multiple low-resolution images and the displacement information. The resolution of the average image is the same as the resolution of the reconstructed high-resolution image.

The point aimed at of the present invention is that it is possible to generate (reconstruct) the high-resolution image by estimating the pixel values of the undefined pixels included in the average image. That is to say, it is possible to generate the high-resolution image if the pixel values of the undefined pixels of the average image can be estimated by some kind of methods.

As an estimation method of the pixel value of the undefined pixel, there are an interpolation method based on the pixel values of the defined pixels existing in the neighborhood of the undefined pixel (hereinafter also simply referred to as "the neighborhood pixels"), a replacement method that the pixel value of the undefined pixel is replaced with the pixel value of an arbitrary reference pixel and a method that performs the alpha blend of results obtained by the above interpolation method and the above replacement method.

Specifically, in the high-resolution image generation method of the present invention, at first, the average image and the weighted image are generated based on multiple obtained low-resolution images (multiple observed low-resolution images) and the displacement information of the low-resolution images obtained by the registration, and then the high-resolution image is generated by estimating the pixel values of the undefined pixels included in the generated average image.

Further, in the present invention, whenever a low-resolution image is obtained, that is to say, whenever a observed image is observed, the high-resolution image is generated sequentially by updating the average image with the undefined pixels and the weighted image and then estimating the pixel values of the undefined pixels included in the updated average image.

Specifically, firstly, the high-resolution image generation method according to the present invention is applied to a low-resolution image obtained first, i.e. a observed image observed first, that is to say, based on the observed image observed first, the registration of that observed image is performed. Next, the average image with the undefined pixels and the weighted image are generated based on the displacement information obtained by the registration processing and the multiple observed images. And then, the high-resolution image is generated by estimating the pixel values of the undefined pixels included in the average image. Here, the generated high-resolution image is regarded as an observed image. Hereinafter the observed image which is regarded in this way, is referred to as "an regarded observation image". In addition, as the observed image obtained first, one image can be utilized or multiple images can be utilized.

Secondly, whenever the observed image is obtained (here also as the observed image obtained, one image can be utilized or multiple images can be utilized), the observed image obtained in that time and the regarded observation image are assembled into multiple observed images, and then the high-resolution image is generated by applying the high-resolution image generation method according to the present invention to these multiple observed images. The generated high-resolution image is also used as the regarded observation image.

In this way, whenever the observed image is obtained, it is possible to generate the high-resolution image sequentially by applying the high-resolution image generation method according to the present invention.

Of course in the processing described above, it is also possible to whenever the observed image is obtained, the observed image obtained in that time and the observed images obtained by then are assembled into multiple observed images, and then the high-resolution image is generated sequentially by applying the high-resolution image generation method according to the present invention to these multiple observed images without regarding the generated high-resolution image as an observed image.

Next, we explain embodiments of the estimation method of the pixel value of the undefined pixel included in the average image (hereinafter also simply referred to as "the undefined pixel value estimation method") in the present invention.

<1> The Undefined Pixel Value Estimation Method 1

"The undefined pixel value estimation method 1" is a method that estimates the pixel value of the undefined pixel by interpolating the pixel values of the defined pixels existing in the neighborhood of the undefined pixel (the pixel values of the neighborhood pixels).

As illustrative embodiments of the undefined pixel value estimation method 1, for example, it is possible to estimate the pixel value of an undefined pixel by (a1) a method that interpolates the Red channel, the Green channel and the Blue channel independently, (a2) a method that interpolates color difference channels (the Red-Green channel and the Blue-Green channel) after interpolating the undefined pixels of the Green channel, or (a3) a method that firstly obtains the luminance (Y) after interpolating the pixel values of the Red channel, the Green channel and the Blue channel of the undefined pixels and then interpolates the undefined pixels again with respect to R-Y, G-Y and B-Y.

<2> The Undefined Pixel Value Estimation Method 2

"The undefined pixel value estimation method 2" is a method that firstly prepares an arbitrary reference image having the number of the pixels same as the average image and then sets the pixel value of the reference image corresponding to the pixel position of an undefined pixel as the pixel value of the undefined pixel.

As illustrative embodiments of the undefined pixel value estimation method 2, for example, it is possible to set (b1) an image obtained by magnifying an observed image (a low-resolution image), (b2) an image obtained by firstly magnifying the observed images observed till now, i.e. all obtained low-resolution images and then averaging the magnified images after considering the displacements of these images, or (b3) a single color image as the reference image.

<3> The Undefined Pixel Value Estimation Method 3

"The undefined pixel value estimation method 3" is a method that estimates the pixel value of the undefined pixel by performing the alpha blend of an undefined pixel value estimated by "the undefined pixel value estimation method 1" (hereinafter simply referred to as a first pixel value of the undefined pixel) and an undefined pixel value estimated by "the undefined pixel value estimation method 2" (hereinafter simply referred to as a second pixel value of the undefined pixel).

As illustrative embodiments of the undefined pixel value estimation method 3, for example, it is possible to estimate the alpha value (α) that is necessary in the case of performing the alpha blend by the following methods.

(c1) a method that changes the alpha value (α) of the alpha blend based on the pixel position of the undefined pixel.

(c2) a method that estimates the alpha value (α) of the alpha blend based on the number of the defined pixels existing in the neighborhood of the undefined pixel, i.e. the number of the neighborhood pixels.

Moreover, as described above, it is possible to use the high-resolution image generated by the high-resolution image generation method according to the present invention as an initial high-resolution image of the super-resolution processing that needs the iterative processing (i.e. the conventional reconstruction-based super-resolution processing).

Next, we explain an embodiment of the high-resolution image generation method according to the present invention.

As described above, the high-resolution image generation method of the present invention is a method that generates the high-resolution image from multiple observed images (multiple low-resolution images), and specifically generates the high-resolution along a flow shown in FIG. 1.

In addition, in order to simplify the description, we explain only the processing for a gray image. However, it goes without saying that a color image can be processed in the same way.

As shown in FIG. 1, at first, an observed image is selected as the basis image from multiple observed images that are obtained, and then the displacements for the observed image selected as the basis image (hereinafter simply referred to as the basis image) are estimated by existing methods. That is to say, the registration processing for the observed image is performed. For example, it is possible to utilize the density gradient method for the estimation of displacements.

Specifically, the luminance is estimated from the observed image and then a luminance image is generated based on the estimated luminance. It is possible to estimate the displacement information between observed images by the density gradient method that sets a homography as a motion model for the generated luminance image.

Next, the average image (the average registration image) and the weighted image are generated based on the estimated displacement information and multiple observed images (see FIG. 1). As described above, if the pixel value of the weighted image is zero, the pixel value of the corresponding average image will not be defined. That is to say, the pixel of the average image corresponding to the pixel of the weighted image that the pixel value is zero, is an undefined pixel.

Here, we describe specific examples of the pixel value estimation method of the undefined pixel in the average image (the undefined pixel value estimation method) in detail.

(1) The Undefined Pixel Value Estimation Using the Neighborhood Pixels

Here, (x,y) is set as the coordinate of the image, and I(x,y) is set as the average image (the average registration image) In this case, the pixel value $\hat{I}(x,y)$ of the undefined pixel corresponding to the position (x,y) is estimated by the following Expression 1.

$$\hat{I}(x, y) = \frac{\sum_{|u| \leq R} \sum_{|v| \leq R} U(u-x, v-y) w(u, v) I(u-x, v-y)}{\sum_{|u| \leq R} \sum_{|v| \leq R} U(u-x, v-y) w(u, v)} \qquad [\text{Expression 1}]$$

Where in the case that the pixel of (x,y) is not defined, U(x,y)=0 holds. On the other hand, in the case that the pixel of (x,y) is defined, U(x,y)=1 holds.

Further, w(x,y) represents a weighting function and R is a parameter that represents a neighborhood region. As the weighting function, for example, it is possible to utilize a Gaussian function.

Therefore, the high-resolution image $h_I(x,y)$ generated by "the undefined pixel value estimation method using the neighborhood pixels", can be represented by the following Expression 2.

$$h_I(x,y) = U(x,y) I(x,y) + [1 - U(x,y)] \hat{I}(x,y) \qquad [\text{Expression 2}]$$

(2) The Undefined Pixel Value Estimation Using the Reference Image

Here, T(x,y) is set as an arbitrary reference image. As the reference image, for example, it is possible to utilize an image obtained by magnifying the basis image or a single color image.

"The undefined pixel value estimation method using the reference image" is a method that the undefined pixel is replaced with T(x,y).

Therefore, the high-resolution image $h_T(x,y)$ generated by "the undefined pixel value estimation method using the reference image", can be represented by the following Expression 3.

$$h_T(x,y) = U(x,y) I(x,y) + [1 - U(x,y)] T(x,y) \qquad [\text{Expression 3}]$$

(3) The Method Applying the Alpha Blend

Figure 2:
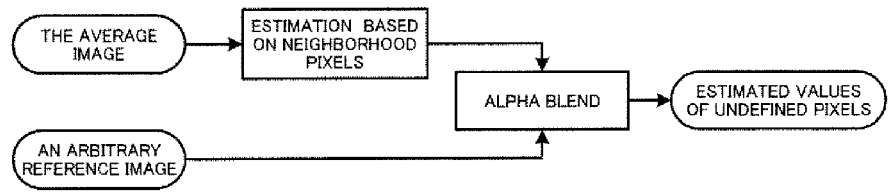
FIG. 2 is a block diagram illustrating an undefined pixel value estimating method utilizing alpha blend of the present invention.

As shown in FIG. 2, "the method applying the alpha blend" to say here, is a method that estimates the pixel value of the undefined pixel by performing the alpha blend of the above "the undefined pixel value estimation using the neighborhood pixels" and the above "the undefined pixel value estimation using the reference image".

Therefore, the high-resolution image $h_\alpha(x,y)$ generated by "the method applying the alpha blend", can be represented by the following Expression 4.

$$h_\alpha(x,y) = \alpha h_I(x,y) + [1-\alpha] h_T(x,y) \qquad [\text{Expression 4}]$$

Where α is the alpha value of the alpha blend.

It is possible to estimate the pixel values of the undefined pixels in the average image by the above undefined pixel value estimation methods. By this way, all pixels of the average image will be defined. In the present invention, the high-resolution image is generated by setting the average image that all pixels are defined as the high-resolution image.

Figure 3:
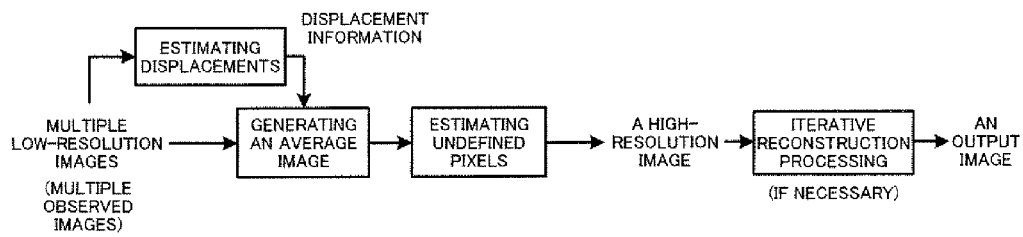
FIG. 3 is a block diagram illustrating another embodiment of the present invention.

Moreover, it is possible to reconstruct a high-resolution image with a more higher definition by using the high-resolution image generated as above, i.e. the high-resolution image generated by the high-resolution image generation method of the present invention as an initial high-resolution image of the super-resolution processing that needs the iterative processing (the iterative reconstruction processing) and then performing the iterative processing. FIG. 3 show a flow of a series of processes.

That is to say, as another embodiment of the present invention, as shown in FIG. 3, firstly, the displacement estimation is performed for multiple obtained low-resolution images and then the average image is generated based on the obtained displacement information and multiple low-resolution images. Secondly, with respect to the undefined pixels in the generated average image, the pixel values of these undefined pixels are estimated by the above "the undefined pixel value estimation method" so that a high-resolution image is generated. Finally, in the case that a high-resolution image with a more higher definition (hereinafter simply referred to as "an output image") is necessary, the output image is obtained by using the generated high-resolution image as an initial high-resolution image of the super-resolution processing that needs the iterative processing and then performing the iterative reconstruction processing.

Specific embodiments of the present invention are explained as above. Next, the present invention is applied to multiple observed images (multiple low-resolution images) that are obtained actually and the effectiveness of the present invention is confirmed.

Figure 4:
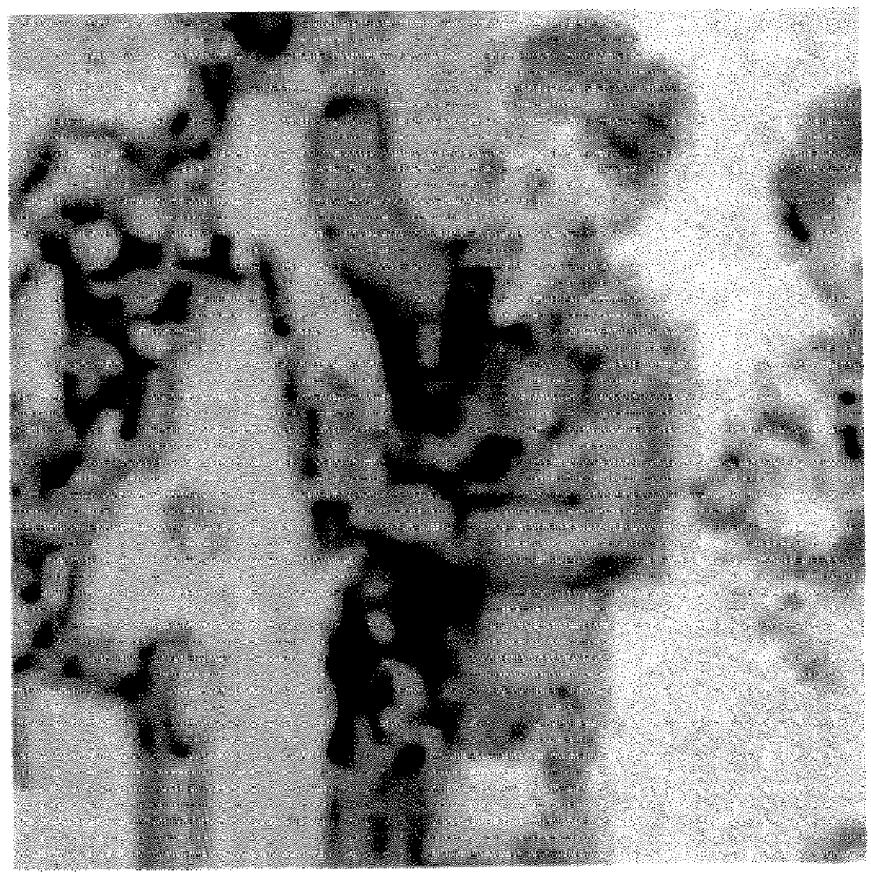
FIG. 4 is a magnified image of the observed image (the low-resolution image)

At first, we confirmed the effect of the high-resolution image generated by the present invention. The registration processes for 30 observed images are performed by the existing method. FIG. 4 is a magnified image of the observed image. Based on these 30 observed images and the displacement information obtained by the registration process, the present invention is applied and a high-resolution image with quadruple the number of pixels in both the vertical and horizontal dimensions, is generated. As a result of this, FIG. 6 shows a high-resolution image based on the undefined pixel estimation utilizing neighborhood pixel values, and FIG. 7 shows a high-resolution image based on the undefined pixel estimation utilizing the basis image.

Figure 5:
FIG. 5 is a drawing illustrating a high-resolution image generated by the method of Chiang et al. disclosed in Non-Patent Document 2.

As the high-resolution image generation method reconstructing a high-resolution image from multiple low-resolution images that does not need an iterative computation, there is the method of Chiang et al. which is already disclosed in Non-Patent Document 2. FIG. 5 shows a high-resolution image generated by the method of Chiang et al. disclosed in Non-Patent Document 2.

Figure 6:
FIG. 6 is a drawing illustrating a high-resolution image based on the undefined pixel estimation utilizing neighborhood pixel values that applies the present invention.
Figure 7:
FIG. 7 is a drawing illustrating a high-resolution image based on the undefined pixel estimation utilizing the basis image that applies the present invention.

From FIGS. 4, 5, 6, and 7, it is clear that as compared with the observed image of FIG. 4 and the high-resolution image of FIG. 5 generated based on the conventional method, the resolutions of the high-resolution images of FIGS. 6 and 7 generated based on the present invention are improved clearly.

Figure 8:
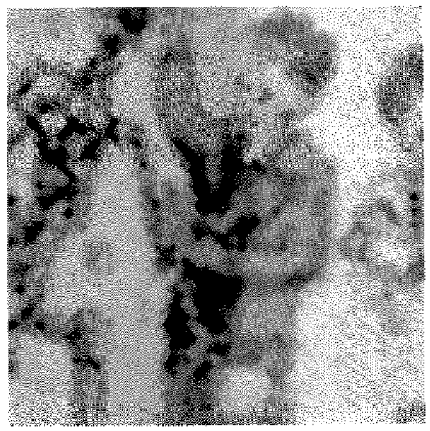
FIG. 8 is a drawing illustrating effects of the sequential high-resolution image generation based on the undefined pixel estimation utilizing neighborhood pixel values that applies the present invention.
Figure 8:
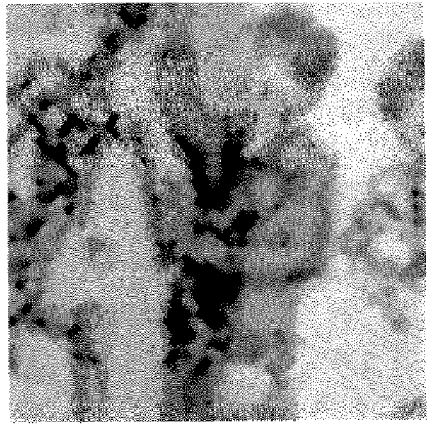
Figure 8:
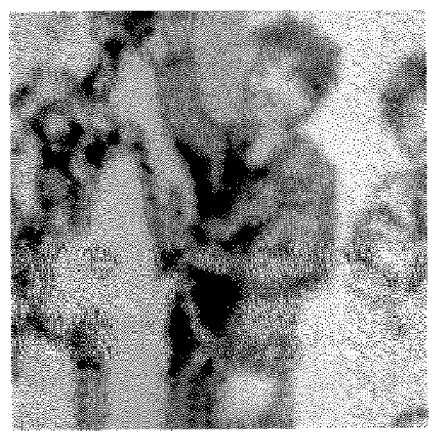
Figure 8:
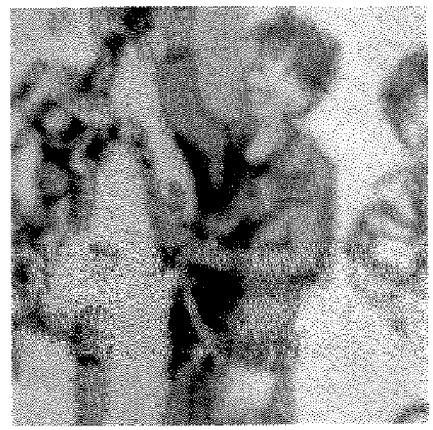
Figure 8:
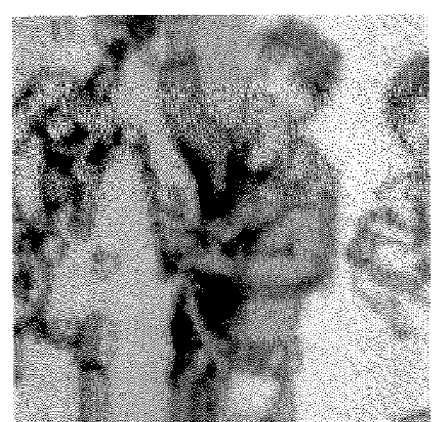
Figure 8:
Figure 9:
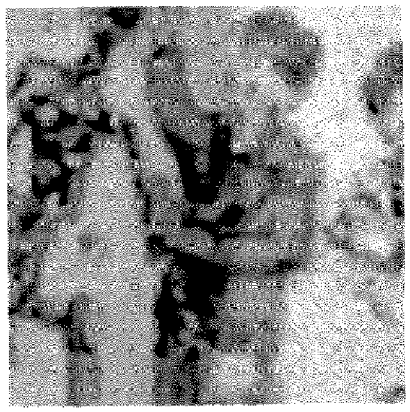
FIG. 9 is a drawing illustrating effects of the sequential high-resolution image generation based on the undefined pixel estimation utilizing the basis image that applies the present invention.
Figure 9:
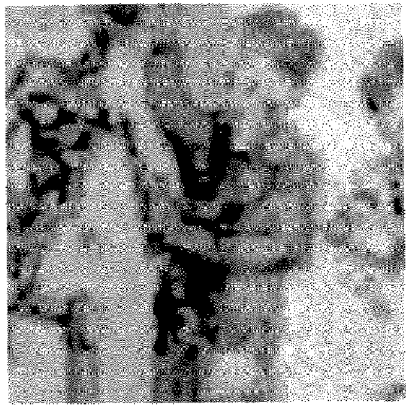
Figure 9:
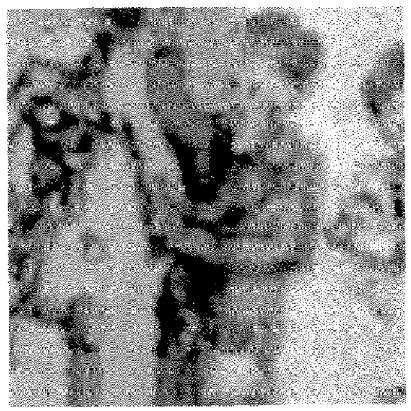
Figure 9:
Figure 9:
Figure 9:
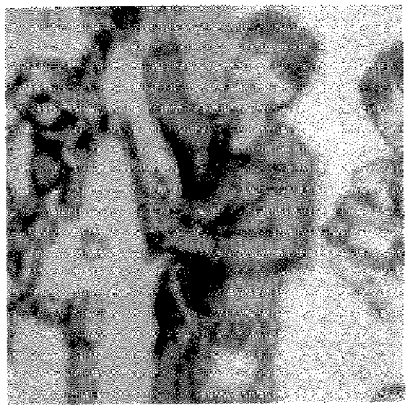

Next, we confirmed the effect of the sequential high-resolution image generation based on the present invention. FIGS. 8 and 9 show the results in the case that the high-resolution image is generated sequentially by applying the present invention while the number of the observed images is increased sequentially.

FIG. 8 shows the results that use the undefined pixel estimation utilizing neighborhood pixel values. FIG. 9 shows the results that use the undefined pixel estimation utilizing the basis image. FIG. 8(A) and FIG. 9(A) illustrate images generated from one observed image. FIG. 8(B) and FIG. 9(B) illustrate images generated from two observed images. FIG. 8(C) and FIG. 9(C) illustrate images generated from five observed images. FIG. 8(D) and FIG. 9(D) illustrate images generated from ten observed images. FIG. 8(E) and FIG. 9(E) illustrate images generated from twenty observed images. FIG. 8(F) and FIG. 9(F) illustrate images generated from thirty observed images.

From FIGS. 8 and 9, an appearance that the high-resolution image is generated sequentially as the number of the observed images increases, is confirmed.

Finally, we confirmed the effect in the case that the high-resolution image generated by the present invention is set as an initial image (an initial high-resolution image) of the iterative reconstruction processing (the conventional reconstruction-based super-resolution processing).

Figure 10:
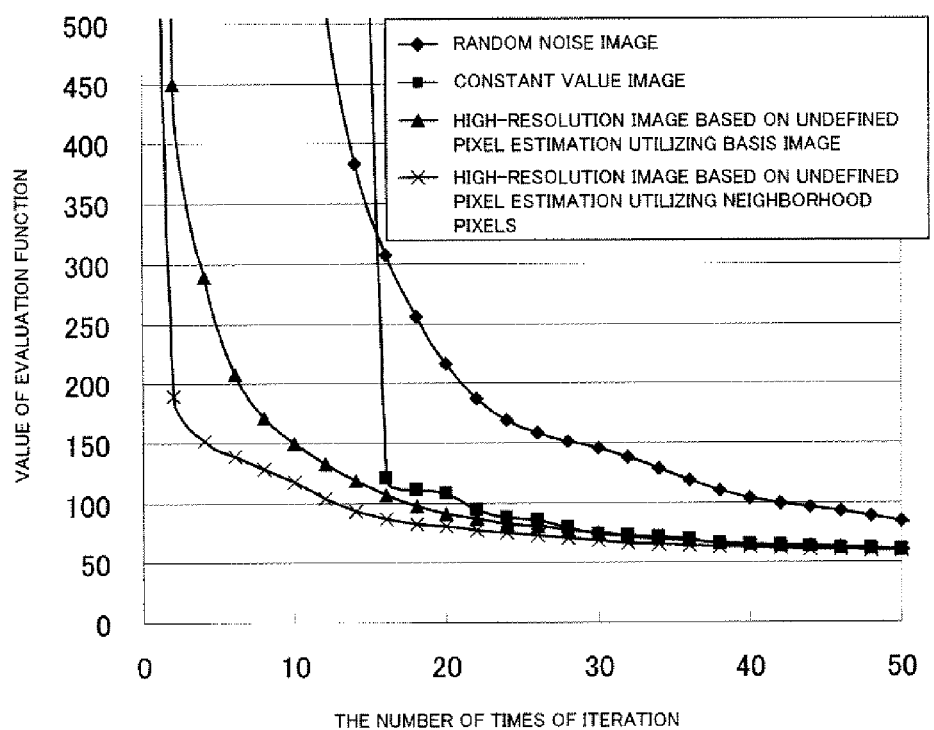
FIG. 10 is a graph illustrating the difference of the convergence property in the case of utilizing different initial images for the conventional reconstruction-based super-resolution processing that needs an iterative computation.

FIG. 10 shows the difference of the convergence property in the case of utilizing different initial images (initial high-resolution images) for the conventional reconstruction-based super-resolution processing that needs an iterative computation.

In the reconstruction method based on the iterative computation, "a fast method of super-resolution processing" (see Japanese Patent Application 2005-134068) realizing speedup of the super-resolution processing (the iterative reconstruction processing) that is developed by inventors of the present invention, is utilized. As the initial image (the initial high-resolution image), an random noise image, a constant value image that all pixel values are a constant value, a high-resolution image based on the undefined pixel estimation utilizing neighborhood pixel values that applies the present invention, and a high-resolution image based on the undefined pixel estimation utilizing the basis image that applies the present invention, are used.

From FIG. 10, it is clear that the efficiency of the iterative computation is improved by using the high-resolution images generated by the present invention (i.e. the high-resolution image based on the undefined pixel estimation utilizing neighborhood pixel values and the high-resolution image based on the undefined pixel estimation utilizing the basis image) as the initial image.

INDUSTRIAL APPLICABILITY

According to the high-resolution image generation method of the present invention, it is possible to quickly and easily generate a high-resolution image from multiple low-resolution images (multiple observed images) having displacements.

In the conventional reconstruction-based super-resolution processing method, since the iterative computation is necessary, the computation cost is very large. In contrast, in the high-resolution image generation method of the present invention, since the iterative computation is unnecessary, the computation cost is small.

Further, whenever the observed image that is a low-resolution image is obtained (input), it is possible to generate the high-resolution image sequentially by applying the present invention. It is impossible to generate the high-resolution image sequentially like the present invention by the conventional reconstruction-based super-resolution processing method.

Moreover, it is possible to use the high-resolution images generated by the present invention as the initial image (the initial high-resolution image) of the iterative computation in the conventional super-resolution processing method. On the other hand, in the conventional super-resolution processing method, it is common to use an image obtained by simply magnifying an observed image that is a low-resolution image as the initial image (the initial high-resolution image).

Therefore, by setting the high-resolution images generated based on the present invention as the initial image of the conventional super-resolution processing, it is possible to obtain a super-resolution image since the computation will be converge at a small number of times of iteration even by the conventional super-resolution processing.

THE LIST OF REFERENCES

Patent Document 1

Japanese Patent No. 3837575

Non-Patent Document 1

S. C. Park, M. K. Park and M. G. Kang, "Super-Resolution Image Reconstruction: A Technical Overview", IEEE Signal Processing Magazine, Vol. 20, No. 3, p. 21-36, 2003.

Non-Patent Document 2

M-C. Chiang and T. E. Boult, "Efficient super-resolution via image warping", Image and Vision Computing, Vol. 18, No. 10, p. 761-771, 2000.

What is claimed is:

1. A high-resolution image generation method for generating a high-resolution image from multiple low-resolution images having displacements, said method comprising:
   a first step of performing a registration processing of said multiple low-resolution images;
   a second step of generating an average registration image in a high-resolution image space having undefined pixels based on the displacement information obtained by said registration processing and said multiple low-resolution images; and
   a third step of generating said high-resolution image by estimating pixel values of said undefined pixels included in said average image, wherein in said first step, corresponding high-resolution pixel position of each pixel of said multiple low-resolution images is calculated by said registration processing, wherein said second step comprises a step that generates said average registration image in a high-resolution image space by respectively computing an average pixel value of multiple low-resolution image pixels whose corresponding high-resolution pixel position is approximated by the same high-resolution pixel position, and when generating said average registration image, a pixel that exists in a high-resolution pixel position by which no low-resolution image pixel is approximated, is treated as said undefined pixel, wherein a method that estimates said pixel value of said undefined pixel by interpolating pixel values of defined pixels existing in the neighborhood of said undefined pixel, is referred to as a first undefined pixel estimation method, wherein a method that sets a predetermined image having the number of pixels same as said average image as a reference image and then sets a pixel value of a pixel of said reference image corresponding to said undefined pixel as said pixel value of said undefined pixel, is referred to as a second undefined pixel estimation method, wherein said third step estimates said pixel value of said undefined pixel by performing an alpha blend of a first undefined pixel value estimated by said first undefined pixel estimation method and a second undefined pixel value estimated by said second undefined pixel estimation method.

2. The high-resolution image generation method according to claim 1, wherein an alpha value of said alpha blend is changed based on a pixel position of said undefined pixel.

3. The high-resolution image generation method according to claim 1, wherein an alpha value of said alpha blend is estimated based on the number of said defined pixels existing in the neighborhood of said undefined pixel.

4. The high-resolution image generation method according to claim 1,
wherein said second step includes generating a weighted image and further comprises a step that generates said weighted image by setting the number of multiple low-resolution image pixels whose pixel positions are approximated by each high-resolution pixel position as a pixel value, when generating said weighted image, a pixel value of a pixel that exists the same position as a pixel position of said undefined pixel of said average image, is set as zero.

5. The high-resolution image generation method according to claim 4, wherein said third step estimates said pixel value of said undefined pixel by interpolating pixel values of defined pixels existing in the neighborhood of said undefined pixel also by using pixel values of said weighted image.

6. The high-resolution image generation method according to claim 4, wherein said third step sets a predetermined image having the number of pixels same as said average image as a reference image and then sets a pixel value of a pixel of said reference image corresponding to said undefined pixel as said pixel value of said undefined pixel.

7. The high-resolution image generation method according to claim 4, wherein a method that estimates said pixel value of said undefined pixel by interpolating pixel values of defined pixels existing in the neighborhood of said undefined pixel also by using pixel values of said weighted image, is referred to as a first undefined pixel estimation method, wherein a method that sets a predetermined image having the number of pixels same as said average image as a reference image and then sets a pixel value of a pixel of said reference image corresponding to said undefined pixel as said pixel value of said undefined pixel, is referred to as a second undefined pixel estimation method, wherein said third step estimates said pixel value of said undefined pixel by performing an alpha blend of a first undefined pixel value estimated by said first undefined pixel estimation method and a second undefined pixel value estimated by said second undefined pixel estimation method.

8. The high-resolution image generation method according to claim 7, wherein an alpha value of said alpha blend is changed based on a pixel position of said undefined pixel.

9. The high-resolution image generation method according to claim 7, wherein an alpha value of said alpha blend is estimated based on the number of said defined pixels existing in the neighborhood of said undefined pixel.

10. A high-resolution image generation method wherein:
a high-resolution image is reconstructed by using said high-resolution image generated by the high-resolution image generation method according to claim 4 as an initial image of super-resolution processing that needs iterative reconstruction processing and then performing said iterative reconstruction processing.

11. A high-resolution image generation method wherein:
a high-resolution image is reconstructed by using said high-resolution image generated by the high-resolution image generation method according to claim 5 as an initial image of super-resolution processing that needs iterative reconstruction processing and then performing said iterative reconstruction processing.

12. A high-resolution image generation method wherein:
a high-resolution image is reconstructed by using said high-resolution image generated by the high-resolution image generation method according to claim 6 as an initial image of super-resolution processing that needs iterative reconstruction processing and then performing said iterative reconstruction processing.

13. A high-resolution image generation method wherein:
a high-resolution image is reconstructed by using said high-resolution image generated by the high-resolution image generation method according to claim 7 as an initial image of super-resolution processing that needs iterative reconstruction processing and then performing said iterative reconstruction processing.

14. A high-resolution image generation method wherein:
a high-resolution image is reconstructed by using said high-resolution image generated by the high-resolution image generation method according to claim 8 as an initial image of super-resolution processing that needs iterative reconstruction processing and then performing said iterative reconstruction processing.

15. A high-resolution image generation method wherein:
a high-resolution image is reconstructed by using said high-resolution image generated by the high-resolution image generation method according to claim 9 as an initial image of super-resolution processing that needs iterative reconstruction processing and then performing said iterative reconstruction processing.

16. A high-resolution image generation method wherein:
whenever a low-resolution image is obtained, by applying the high-resolution image generation method according to claim 4, a high-resolution image is generated sequentially by updating said average image with said undefined pixels and said weighted image and then estimating pixel values of said undefined pixels included in said updated average image.

17. A high-resolution image generation method wherein: whenever a low-resolution image is obtained, by applying the high-resolution image generation method according to claim 5, a high-resolution image is generated sequentially by updating said average image with said undefined pixels and said weighted image and then estimating pixel values of said undefined pixels included in said updated average image.

18. A high-resolution image generation method wherein: whenever a low-resolution image is obtained, by applying the high-resolution image generation method according to claim 6, a high-resolution image is generated sequentially by updating said average image with said undefined pixels and said weighted image and then estimating pixel values of said undefined pixels included in said updated average image.

19. A high-resolution image generation method wherein: whenever a low-resolution image is obtained, by applying the high-resolution image generation method according to claim 7, a high-resolution image is generated sequentially by updating said average image with said undefined pixels and said weighted image and then estimating pixel values of said undefined pixels included in said updated average image.

20. A high-resolution image generation method wherein: whenever a low-resolution image is obtained, by applying the high-resolution image generation method according to claim 8, a high-resolution image is generated sequentially by updating said average image with said undefined pixels and said weighted image and then estimating pixel values of said undefined pixels included in said updated average image.

21. A high-resolution image generation method wherein: whenever a low-resolution image is obtained, by applying the high-resolution image generation method according to claim 9, a high-resolution image is generated sequentially by updating said average image with said undefined pixels and said weighted image and then estimating pixel values of said undefined pixels included in said updated average image.

* * * * *